Dec. 15, 1942.　　M. F. PETERS ET AL　　2,305,555
ELECTRICAL CONDUCTOR
Filed Sept. 26, 1940

Inventors,
Orville C. Hollopeter,
Melville F. Peters,
by
Attorney.

Patented Dec. 15, 1942

2,305,555

UNITED STATES PATENT OFFICE 2,305,555

ELECTRICAL CONDUCTOR

Melville F. Peters, Beltsville, Md., and Orville C. Hollopeter, Englewood, N. J.

Application September 26, 1940, Serial No. 358,550

2 Claims. (Cl. 174—132)

This invention relates to wires and cables and more particularly to wires and cables comprising a tungsten portion.

One object of the invention is to provide improved wires and cables of this kind which are of increased tensile strength and light in weight.

Other objects of the invention are to provide improved wires and cables of this kind which have high electrical conductivity and flexibility.

Additional objects of the invention are to effect simplicity and efficiency in such wires and cables and to provide extremely simple wires and cables of this kind which are economical, durable, and reliable in operation, and economical to manufacture and install.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

In many types of cable the mechanical strength of the conductor determines the minimum cross-section area. This is especially true for cable used by the Signal Corps, where great strength and light weight are of paramount importance. For many classes of wire copper alone is unsatisfactory, because it is mechanically weak, although its good electrical conductivity is necessary.

It has been found that by combining a conductor of tungsten with conductors of copper, a stranded conductor is obtained which has great strength, flexibility and good electrical conductivity with little increase in weight.

Since fine tungsten wire is flexible it may be combined with other wires to form a cable and the addition of the tungsten wire does not greatly affect the flexibility of the cable compared to a similar cable without the tungsten wire.

In ignition cable a small cross-sectional area is desirable. Among the properties required is good mechanical strength. By combining tungsten with copper, stainless steel or iron this strength can be obtained.

For wire supports on airplanes, control cables, or antenna wire, tungsten may be used alone or in combination with any other metal to give a cable with the smallest weight and the smallest diameter for a specified strength, or a specified electrical conductivity.

With many alloys such as stainless steel a high electrical resistance is desirable, but good annealing which is necessary for insulating purposes and drawing into conduit weakens the wire mechanically. By including a tungsten wire in the stranded cable the stainless steel or other alloys may be well annealed for flexibility and not sacrifice the strength of the stranded conductor.

The inventive features for the accomplishment of these and other objects are shown herein in connection with two embodiments of the invention one of which is a cable, which briefly stated includes one or more tungsten wires in combination with wires of other material. The tungsten wire is included primarily to contribute strength to the cable. The other embodiment shown is a composite wire in which there is a core of tungsten and a coating of another metal.

In the accompanying drawing showing, by way of example, two of many possible embodiments of the invention, Fig. 1 is a fragmental view of a stranded cable embodying the invention;

Figure 1:
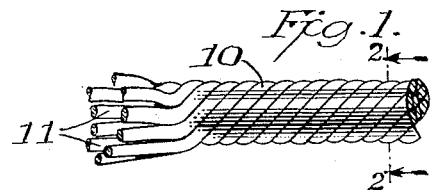
Figure 2:
Fig. 2 is a sectional view of the cable of Fig. 1 taken along the line 2—2.
Figure 3:
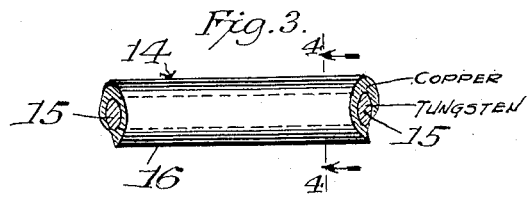
Fig. 3 is a fragmental view of a coated wire in accordance with the invention.
Figure 4:
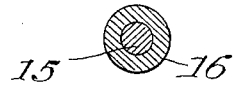
Fig. 4 is a sectional view of the wire of Fig. 3 taken along the line 4—4.

The stranded cable 10 in accordance with the invention comprises a plurality of bare or coated wire strands 11, one or more of said strands being tungsten wires to increase the tensile strength of the cable. The remaining wires are of a material suitable to the needs of the cable, such as copper for conducting heat or electricity. The distribution of the tungsten strands may be in any arrangement depending on the use to which the cable is put. For example, the tungsten wires, or wire, may be located in the core portion or they may be evenly distributed over the peripheral portion. While a conventional cable is shown in the drawing, the invention is not so limited. An embodiment of the invention may be in the form of a braided cable, either round or flat or even in the form of woven cloth, it being understood that the main advantage of the present improvement is an improvement in a cable as above described including a tensile reinforcing metallic element of an unlike conductive capacity whereby the cable may be strengthened.

Another form of the invention comprises a coated wire 14 having a tungsten core 15 and a coating of another metallic material 16. The coating may be of any material having desired properties other than those of tungsten, such as copper for conductivity. The coating may be applied by any of the known methods such as a hot metal dip or electroplating. The coating thickness and the core diameter may be of dimensions best suited for the use of the wire.

It is understood, that, if indicated and required, the herein disclosed wiring may be coated with an insulated sheathing, without departing from the inventive features herein, such insulative sheathing or coating being common and well known in this art.

Figure 5:
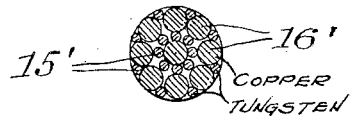
Fig. 5 is an enlarged cross sectional view of a cable involving wires or unlike metals.

In Fig. 5 there is disclosed an enlarged cross sectional view of a cable, constructed under the above disclosure of the aforementioned description, and as shown therein the strands of copper wire such as 16' amongst which are interspersed smaller wire strands 15', which may be preferably of unlike metal such as tungsten wire.

In addition to the function of adding strength to the conductors, the tungsten portions have the new function of preventing hysteresis losses and self induction which result from the use of steel wire. The tungsten tension portion has the advantage of being non-magnetic and it can thus be used in any arrangement. In addition to the absence of any appreciable tendency to promote self induction the tungsten strengthening portion has the added characteristic of being about twenty times more effective as an electrical conductor per unit of tensile strength than is steel. Thus the tungsten portion has the third function of adding compactness to the conductor. This function is greatly desired in many applications such as in ignition cables, antennas, and signal lines.

The invention claimed is:

1. An electrical conductor comprising a tungsten core for increasing the tensile strength with compactness of the conductor without materially increasing magnetic effects and a copper sheath for said core for electrical conductance.

2. An electrical conductor for use between two widely separated points and containing a tungsten core to provide tensile strength for the conductor and a copper covering for conductivity.

ORVILLE C. HOLLOPETER.
MELVILLE F. PETERS.